United States Patent [19]

Stillman

[11] 4,096,309
[45] Jun. 20, 1978

[54] LAMINATED PACKAGING MATERIAL

[75] Inventor: Nathan Stillman, Walnut Creek, Calif.

[73] Assignee: Champion International Corporation, Stamford, Conn.

[21] Appl. No.: 713,883

[22] Filed: Aug. 12, 1976

[51] Int. Cl.² .............................................. B32B 7/04
[52] U.S. Cl. ............................ 428/285; 229/3.5 MF; 428/286; 428/457; 428/461; 428/910
[58] Field of Search ................. 229/3.5 MF; 428/209, 428/211, 284, 285, 286, 296, 297, 457, 461, 910; 156/176, 178, 179, 306, 309

[56] References Cited
U.S. PATENT DOCUMENTS

| | | | |
|---|---|---|---|
| 3,066,847 | 12/1962 | Fortune | 229/3.5 MF |
| 3,075,864 | 1/1963 | Anderson | 428/457 |
| 3,222,149 | 12/1965 | Drummond | 156/167 |
| 3,341,394 | 9/1967 | Kinney | 428/296 |
| 3,572,499 | 3/1971 | Mondano | 229/3.5 MF |
| 3,813,315 | 5/1974 | Valyi | 156/309 |
| 3,837,992 | 9/1974 | Sherman et al. | 156/309 |
| 3,873,409 | 3/1975 | Jehler | 156/309 |
| 3,874,971 | 4/1975 | Black et al. | 156/309 |

Primary Examiner—James J. Bell
Attorney, Agent, or Firm—Evelyn M. Sommer

[57] ABSTRACT

A flexible, laminated packaging material is disclosed. This material — composed, in order, of a non-woven sheet of spun-bonded polymeric filament; a metallic foil; and an inner surface ply of heat-sealable polyolefin — is readily produced and yields an exceptionally strong and durable laminate useful inter alia for the production of container bags and pouches capable of retaining contents of substantial volume and/or weight.

5 Claims, 4 Drawing Figures

LAMINATED PACKAGING MATERIAL

INTRODUCTION TO THE INVENTION

An object of this invention is the production of self-sealing, packaging laminate of extremely high strength and capacity.

Another object of this invention is the provision of the various layers of the packaging laminate in a sequence which provides maximum inter-layer cooperation and simplifies manufacture.

A particular object of this invention is the provision of a flexible, laminate material which can be self-sealed into pouches, bags and like packaging containers which are collapsible and so may be easily transported when empty while being capable of retaining contents of high weight and volume.

These, and other objects and advantages of the invention as are described hereinafter, are obtained through the present invention.

DESCRIPTION OF THE INVENTION

This invention relates to the production of a laminate or composite packaging material of highly improved properties.

It has long been sought to produce laminated materials useful in pouch or bag-like packaging forms for the transport and storage of high volumes and/or weights of materials. Although cans, cartons, and like containers of fixed dimensions have long been employed for transporting hop pellets, fruit concentrates, fruit pulps, syrups, etc., these rigid containers have many drawbacks.

Because they are rigid, they must be unusually strong to withstand the physical stress exerted by their contents. This is particularly true with larger volumes of liquid or semi-liquid materials which may shift during transport. In addition, their rigid, heavy construction makes them uneconomical to transport unless filled. Even when empty, they occupy their full volume. Therefore they are desirably produced close to the site of filling and used only once.

This invention makes possible the provision of lightweight pouches, bags and other flexible containers for the packaging of substantial volumes and/or weights of both liquid and solid materials. The flexibility and strength of these films—even in large container form—permit them to contain volumes of, for example, from 5 to 20 liters and weights of, for example 20 to 30 kilograms. Moreover, because containers composed of the present laminate materials can be compressed into essentially flat form when empty, they are easily shipped, stored, transported and reused.

The laminate materials of this invention are composed of three essential layers or plies. These layers are (in order, from the outside to the inside of a packaging wall):

(1) a non-woven sheet of spun-bonded polymeric filament;
(2) a flexible metallic foil; and
(3) a heat-sealable polyolefin.

When affixed together, ordinarily through use of conventional sealers and adhesives, these three layers produce a composite, laminated material of unusually high strength and container properties.

The outermost essential ply is composed of a non-woven sheet of spun-bonded polymeric filament. These sheets have unusually high strength and flex-resistance. In addition, they provide desirable resistance to bursting or tearing of the laminate material.

The polymer of this filament is ordinarily composed of polypropylene, polyethylene, and/or polyester. Non-woven sheets of these spun-bonded filaments are readily available commercially. Preferably, however, they are composed of medium to high density polymer — i.e. polymer of from 0.902 to 0.910 g/cc — and particularly high density polypropylene.

Being the ply primarily relied upon for the strength of the laminated material, the thickness of these spun-bonded sheets may vary greatly depending upon the weight or volume of the contents which the container is intended to hold. Ordinarily, however, sheets within the range of from about 60 to 160 gram/meter$^2$ and preferably 70 to 100 gram/meter$^2$, are employed. Lighter weights within this range are adequate for the contents of about 20 kg weight, whereas the higher weight sheets are for particularly large containers of up to 500 to 1,000 kg.

The second, essential layer may be composed of any of the flexible metal foils known in the art. These foils — such as lead, copper, and preferably aluminum — are ordinarily of a thickness of between 0.006 and 0.025 millimeter, with a thickness of from 0.007 to 0.014 mm. being particularly preferred. In addition to providing excellent protection from ultra-violet light, these films have a high resistance to vapor penetration and thus provide an excellent barrier against penetration of either gas or liquids through the laminated material.

The third and innermost essential layer of the present laminated materials is composed of heat-sealable polyolefin. This olefin layer may be composed, for example, of polyethylene or polypropylene. It provides a layer through which the present films may be self-sealed to produce a pouch or bag-like containers.

This layer ordinarily has a thickness of from 0.04 to 0.14 mm, with from 0.05 to 0.08 mm being particularly preferred. Such a thickness ensures ready sealability and additionally contributes substantially to the impermeability of the film as a whole.

Although virtually any heat-sealable polyolefin may be utilized herein, high temperature resistant polyolefin having a density of from 0.915 to 0.945 g/cm — and particularly polyethylene, is preferred. Thus, for example, medium density polyethylene having a melting point of from about 70° to 90° C — so as to permit its hot fill application to the film at temperatures of from about 85° to 95° C — is particularly desirable. The important consideration in the choice of the heat sealable polyolefin is that it possess a melting point which will ensure polymer stability and non-melting at the conditions of filling.

In addition to these three essential layers, certain optional layers and treatments have been discovered which enhance the strength, durability and desirability of containers made from the present laminated materials. These additional layers and treatments may be utilized, either individually or in combination, further to improve the characteristics of these laminates.

One optional layer is a film of polyolefin. It should be provided between the non-woven sheet and metallic foil previously described. Such a film, ordinarily having a thickness of from about 0.006 to 0.02 mm., preferably from 0.01 to 0.015 mm., adds considerable strength and flex-resistance to the composite laminate. Additionally — and in contrast to the adjacent non-woven sheet — the polyolefin film provides a smooth surface which facilitates bonding to the metallic foil. It thereby provides added resistance to delamination of the present packaging materials.

In a preferred embodiment, this film is composed of biaxially-oriented polyolefin. It may be composed of any of the polyolefins such as polyethylene and polypropylene known in the art and which have been stretched to produce a biaxial and preferably balanced-biaxial orientation. Because these films — particularly those of the preferred polypropylene — are also highly flex/crack-resistant, they contribute significantly to the overall strength of the laminated material.

Tight adherence between the non-woven sheet, polyolefin film and metallic foil is ordinarily provided by adhesive layers between these plies. Suitable adhesives include urethane prepolymers, thermoplastic adhesives such as low density polyethylene and the like. A suitable resin, for example, a urethane pre-polymer provided in a thickness of from about 0.001 to 0.005 mm., will suffice for this purpose. Preferably, however these three plies are affixed through polyethylene layers extruded between the separate plies. This is not only a particularly convenient means of making the laminate, but also provides enhanced composite integrity.

Even in embodiments where the optional polyolefin film is absent, an adhesive layer between the non-woven sheet and metallic foil is preferred. Again, such a coating ensures the integrity of the packaging material and protects against delamination.

The coarse, irregular surface of the non-woven sheet makes a still further ply desirable. Particularly in handling filled containers of the present laminate, an outermost surface ply of non-woven sheeting presents undesirable handling problems. In stacking, sliding or otherwise handling filled containers, there is sufficient friction—and even catching and tearing—of this coarse material to cause its delamination or even complete tearing. Consequently, the laminated material is desirably provided with a face ply of smooth, non-porous material on this surface.

This face ply may be composed of any number of readily available materials. Most conveniently and inexpensively, however, paper is utilized. Thus, for example, a natural or bleached Kraft paper ply having a thickness of from 0.05 to 0.15 mm. may be affixed to the outer surface of the non-woven sheet to facilitate handling of the ultimate containers.

This face ply is ordinarily affixed to the non-woven sheet with a layer of adhesive such as those already described hereinabove. Again, such a layer ensures the integrity of the composite packaging material and protects against delamination.

The formation of the composite laminates of this invention may be performed by any of the means common in the art. The preferred means of such formation will vary in known manner, dependent upon available machinery and the selection of what, if any, optional plies or layers are to be employed.

Where convenient, however, these laminates are most easily prepared in sub-combinations and then united. Thus, for example, the non-woven sheet and polyolefin sheet may be affixed by sandwich extrusion with polyethylene. The foil may simultaneously be coated with heat-sealable polyolefin. These these two composites and the face ply may be united in further sandwich extrusion steps.

Once the laminate material is formed, the manufacture of bags, pouches and like containers is also within the ordinary skill in the art. Thus, for example, an essentially rectangular sheet of the present laminate may be folded at its approximate mid-point and any two contingent sides then joined by the application of heat sufficient to heat-seal their edges. Such technique results in a four-sided envelope construction which may then be filled with the desired contents prior to heat-sealing of the remaining edge.

In many of the desired uses for the present packaging materials and containers made therefrom, it is desired to avoid the presence of oxygen within the enclosed container. Because of the high impermeability to gases or liquids provided by the present materials, such a storage environment is readily obtained. It is necessary merely to flush the container envelope with inert gas or apply a vacuum through conventional means to void oxygen from the container. Subsequent heat-sealing of the final edge then ensures a protective environment for the container contents.

To facilitate use with a protective environment, these containers may be provided with a spigot or nozzle. This permits sealing of the entire perimeter of the envelope prior to evacuation or flushing. It also renders the containers readily reusable with liquid contents. Where solid contents are desired, the containers are still reusable however. All that is required is that a perimeter seal portion be removed by, for example, cutting it off. Then, after first emptying and then re-filling the container, the new, open edges of the resultant envelope may be heat-sealed to form a new perimeter seal portion.

BRIEF DESCRIPTION OF THE DRAWINGS

The subject matter of the present invention is more completely described by reference to the accompanying drawings wherein.

DESCRIPTION OF THE DRAWINGS

Figure 1:
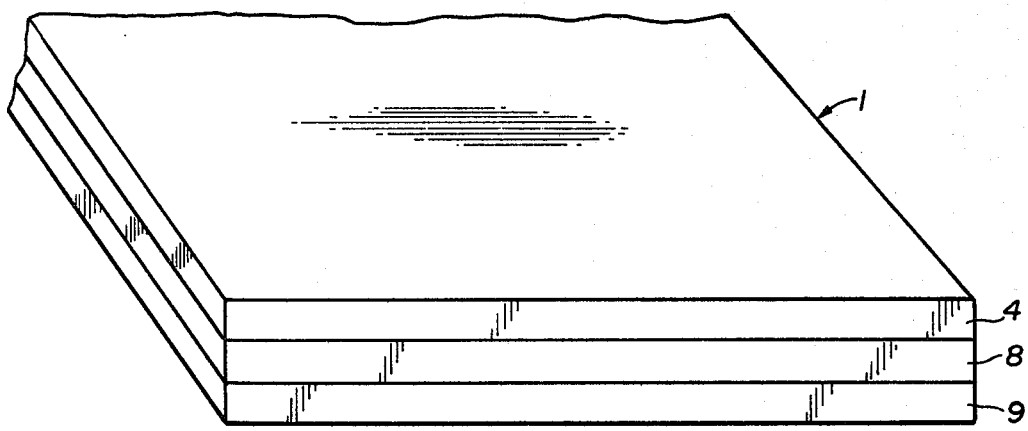
FIG. 1 is a side view showing the laminate material of the present invention having only the three essential film layers.
Figure 2:
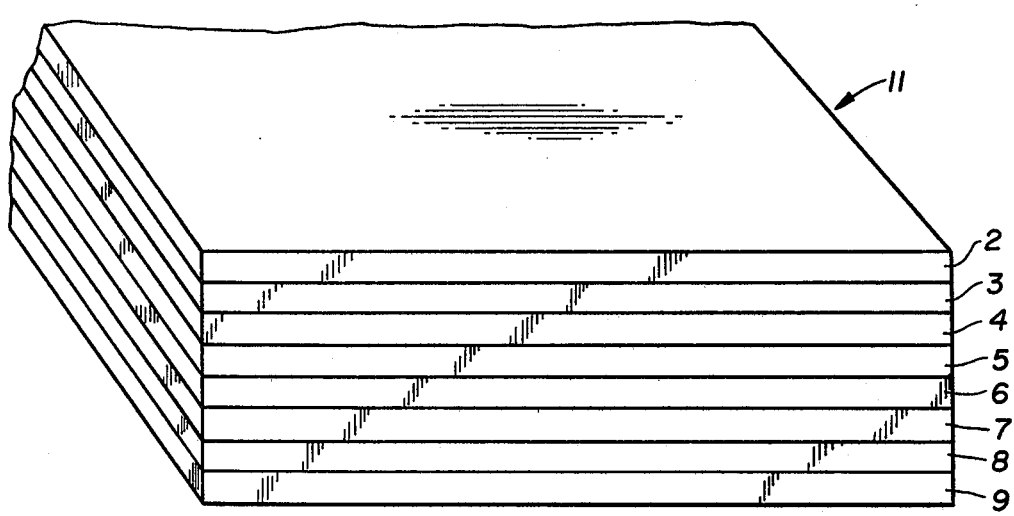
FIG. 2 is a side view showing a laminate material of the present invention which includes both the three essential layers and various optional layers therefor.

With reference to FIGS. 1 and 2, composite packaging films of the present invention are depicted as laminates 1 and 11 respectively. In FIG. 1, only the essential layers of this invention are disclosed, these layers being an outer layer of non-woven, spun-bonded polymeric filament 4, a metallic foil 8, and an inner surface ply of heat-sealable polyolefin 9.

The packaging laminate 11 depicted in FIG. 2 shows both the essential layers (also shown in FIG. 1) and the various optional layers already described herein. These essential layers 4, 8 and 9 are of the same composition as previously described with respect to FIG. 1. In addition, however, there is depicted a smooth surface ply of paper 2 and a polypropylene film 6. Finally, layers 3, 5 and 7 depict adhesive or extruded polyethylene plies which enhance the integrity of the composite laminate.

Figure 3:
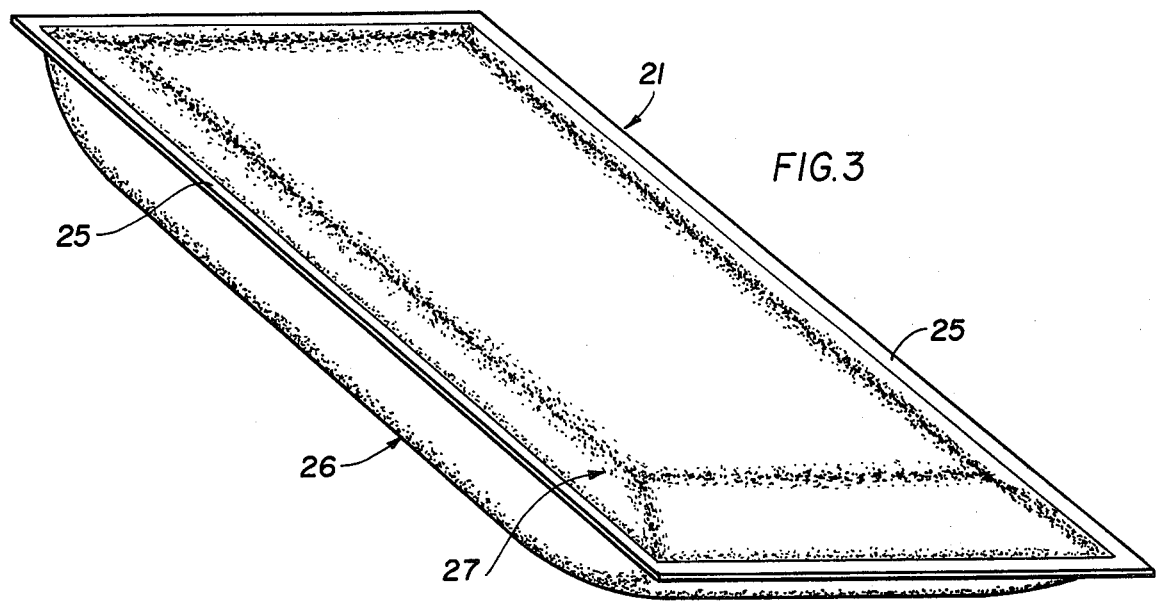
FIG. 3 is a plain view showing a pouch composed of the packaging material of the present invention.

With reference to FIG. 3, there is illustrated a pouch formulated from two composite, packaging films of this invention. The pouch 21 (shown in expanded form as it would exist if the pouch were filled) is composed of the two separate packaging films 26 and 27. The edges of the pouch 21 are indicated to comprise a sealed perimeter portion 25 (composed of joined layers 26 and 27) by which the contents of the pouch are defined.

Figure 4:
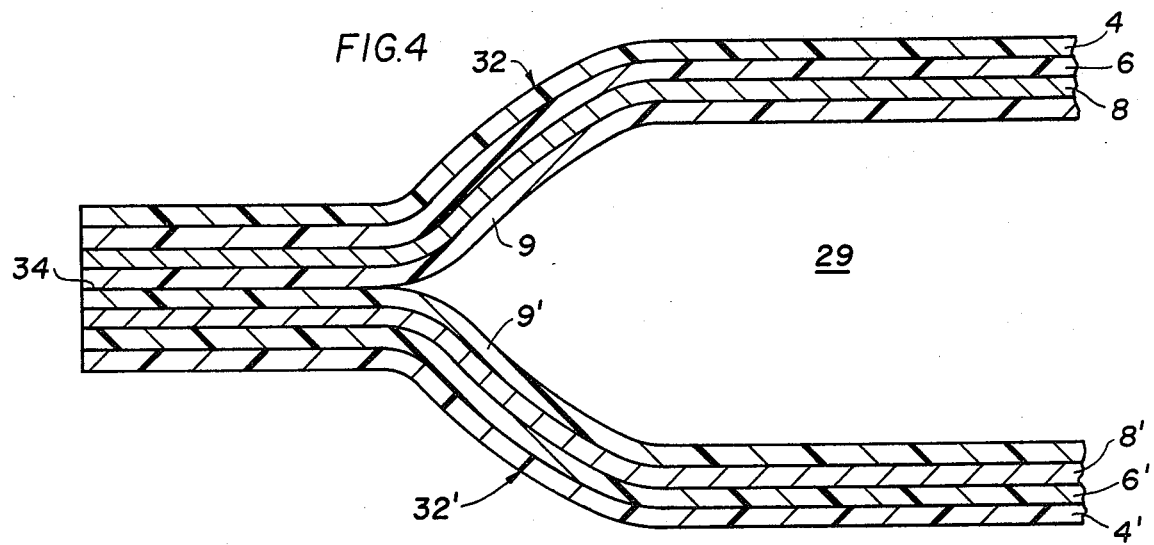
FIG. 4 is a partial cross-sectional view of a pouch composed of two adherent laminate materials of this invention.

FIG. 4 illustrates a cross-sectional view of a portion of the pouch of FIG. 3. This disclosed portion represents the perimeter and partially interior view of the pouch walls. The opening 29 within the pouch shows a degree of expansion of the pouch within which the contents would be held. Also shown is the orientation of the two packaging films 32 and 32'. These two separate film layers of heat-sealable polyolefin 9 and 9' are contingent and bondable, one to the other, so as to form a single, double thickness of heat-sealed polyolefin 34 at the perimeter of the pouch. The remaining layers 4, 6 and 8 of film 32 and 4', 6' and 8' of film 32' are of the same compositions as previously described with respect to FIG. 1 and FIG. 2.

The pouch depicted in FIG. 3 in plain view and in FIG. 4 in cross-section is formed from two of the packaging films of the present invention. These pouches are conveniently prepared by laying one sheet directly over the other and applying heat and pressure only about the outer perimeter of the overlapping films so as to form a heat-sealed joint surrounding the pouch. This pouch permits easy transportation in compressed form and ready filling with a material which will cause it to expand.

Certain changes or modifications in the practice of the present invention can be readily entered into without substantially departing from the intended spirit and scope. Therefore, it is to be fully understood that the invention is not to be limited or in any way restricted by the preferred embodiments in the drawings of the foregoing specification. Rather the scope of this invention is to be interpreted and construed in light of what is set forth and delineated in the appended claims.

I claim:

1. A flexible laminated packaging material comprising:
   (a) a non-woven sheet of spun-bonded polymeric filament;
   (b) a metallic foil affixed to said non-woven sheet;
   (c) an inner surface ply of heat-sealable polyolefin affixed to said metal foil; and
   (d) an outer surface ply of smooth, non-porous material, adhesively affixed to said non-woven sheet.

2. A flexible laminated packaging material comprising:
   (a) a non-woven sheet of spun-bonded polymeric filament;
   (b) a metallic foil affixed to said non-woven sheet;
   (c) an inner surface ply of heat-sealable polyolefin affixed to said metal foil; and
   (d) a biaxially-oriented polyolefin film affixed to and between said non-woven sheet and said metallic foil.

3. The material of claim 1, in which the non-woven sheet and metallic foil are adhesively affixed through a layer of extrusion-coated polyethylene.

4. The material of claim 2, in which the biaxially-oriented polyolefin is polypropylene.

5. The material of claim 1, in which the outer surface ply is paper.